United States Patent [19]

Hayasaka

[11] Patent Number: 4,487,486
[45] Date of Patent: Dec. 11, 1984

[54] VERTICAL ILLUMINATOR FOR MICROSCOPE

[75] Inventor: Toshimi Hayasaka, Hachioji, Japan
[73] Assignee: Olympus Optical Co., Ltd., Japan
[21] Appl. No.: 396,407
[22] Filed: Jul. 8, 1982

[30] Foreign Application Priority Data

| Jul. 28, 1981 | [JP] | Japan | 56-117984 |
| Jul. 28, 1981 | [JP] | Japan | 56-117985 |
| Oct. 12, 1981 | [JP] | Japan | 56-162426 |
| Oct. 12, 1981 | [JP] | Japan | 56-162427 |

[51] Int. Cl.³ ............... G02B 21/10; G02B 21/12
[52] U.S. Cl. ................... 350/525; 350/526; 350/528; 350/318
[58] Field of Search ........... 350/525, 526, 528, 523, 350/527, 318

[56] References Cited

U.S. PATENT DOCUMENTS

| 1,157,257 | 10/1915 | Siedentopf | 350/525 |
| 2,103,230 | 12/1937 | Benford et al. | 350/527 |
| 2,766,655 | 10/1956 | Pinkowski | 350/526 |
| 4,329,014 | 5/1982 | Reinheimer et al. | 350/525 |
| 4,368,947 | 11/1983 | Yoshinaga et al. | 350/526 |

FOREIGN PATENT DOCUMENTS

| 569884 | 2/1933 | Fed. Rep. of Germany | 350/526 |
| 52-40149 | 3/1977 | Japan . | |
| 54-103362 | 8/1979 | Japan . | |

*Primary Examiner*—Jon W. Henry
*Attorney, Agent, or Firm*—Ostrolenk, Faber, Gerb & Soffen

[57] ABSTRACT

A vertical illuminator for microscope permits a choice between a vertical bright and a vertical dark field illumination. The illuminator includes a light diminishing member or a light shield member which is operated in response to an illumination switching operation. The light diminishing member may be moved out of an illumination light path or the light shield member may be temporarily advanced into the illumination light path, as desired, thereby decreasing a difference in the brightness of the field of view as the illumination is switched. In this manner, the observation is facilitated and the likelihood of damaging the eyes of a viewer is eliminated.

15 Claims, 19 Drawing Figures

VERTICAL ILLUMINATOR FOR MICROSCOPE

BACKGROUND OF THE INVENTION

The present invention relates to a vertical illuminator for a microscope, and more particularly, to such an illuminator which permits a switching between a vertical bright field illumination and a vertical dark field illumination, by moving an optical element such as a half mirror or an annular reflecting mirror into or out of an illuminating light path.

A vertical illuminator for a microscope is used to illuminate the surface of a specimen from an objective lens side when such a specimen is opaque (for example, when it is formed of a metallic material). It is known that such a vertical illuminator may be used to provide a bright field illumination in which a specimen is illuminated through an objective lens or a dark field illumination in which the specimen is illuminated through an annular reflecting mirror or a lens which is disposed in surrounding relationship with an objective lens.

A vertical illuminator is known in the prior art which permits a selection between a bright and a dark field illumination. By way of example, in one illuminator of the kind described, a half mirror which is used to provide a bright field illumination and an annular reflecting mirror which is used to provide a dark field illumination are integrally formed with a bright field illumination lens and a dark field illumination lens, respectively, so that the latter may be selectively brought into an illuminating light path to provide a desired illumination.

One difficulty experienced with such a vertical illuminator results from a large difference in the brightness of a field being observed when the illumination is switched from the dark to the bright field illumination. In particular, when observing a specular specimen which exhibits a high optical reflectivity, the resulting difference is so high that the eyes of a viewer may be damaged. In addition, each time the illumination is changed, the brightness of the field being observed may be adjusted, which is inconvenient.

To accommodate for this, there is proposed in Japanese Laid-Open Patent Application No. 103,362/1979 an illuminator which permits a light flux adjusting filter to be detachably disposed in the light path when the bright field illumination is utilized. However, this results in a troublesome operation since the filter must be moved into or out of the light path each time the illumination is changed.

As disclosed in Japanese Laid-Open Patent Application No. 40,149/1977, there is also proposed an illuminator which inserts a filter into the light path whenever the bright field illumination is used. However, this prevents a sufficient illumination from being provided, because of the presence of the filter in the light path, when it is desired to provide an increased magnitude of illumination for taking pictures.

Another difficulty found in conventional vertical illuminators occurs when changing from the dark to the bright field illumination or vice versa. In this instance, any slight displacement of the annular reflecting mirror, which is used to provide the dark field illumination, from the optical axis of an objective lens prevents the illuminating light from the mirror from producing a dark field illumination. Specifically, part of the illuminating light is allowed to impinge upon the surface of a specimen directly without being intercepted by a light shielding sleeve, allowing the light reflected by the surface to travel into the field of view, thus disadvantageously causing temporary glaring of part of the field of view. While such disadvantage represents a temporary phenomenon which occurs during the switching of the light path, the eyes of a viewer may be damaged if the switching takes place during the time the viewer is observing the specimen.

SUMMARY OF THE INVENTION

It is an object of the present invention to provide a vertical illuminator for a microscope including a light diminishing member which is automatically inserted into illuminating light path whenever the illumination is changed from a dark to a bright field illumination and which can be driven out of the illuminating light path as desired.

It is another object of the invention to provide a vertical illuminator for microscope including a light shield member which is automatically driven into part of illuminating light path whenever the illumination is changed.

In accordance with the invention, when the illumination is changed from a dark to a bright illumination, the light diminishing member is automatically inserted into the illuminating light path to decrease a difference in the brightness of the field of view which occurs as the illumination is changed, thus protecting the eyes of a viewer. No adjustment of the brightness of the field is required when changing the illumination, thus simplifying the observation. If required, the light diminishing member can be driven out of the illuminating light path, thus enabling a picture to be taken with illumination of a higher level than that used during the observation.

In another aspect of the invention, the light shield member is driven into part of the illuminating light path when the illumination is changed, thus effectively preventing the incidence of extraneous light into the field of view during the changing operation and protecting the eyes of a viewer. The movement of the light shield member into the illuminating light path takes place automatically in interlocked relationship with an illumination changing operation, without requiring any special operation therefor.

BRIEF DESCRIPTION OF THE DRAWINGS

FIG. 2 is a horizontal section of the switching assembly taken along the line II—II shown in FIG. 1;

DESCRIPTION OF PREFERRED EMBODIMENTS

Figure 1:
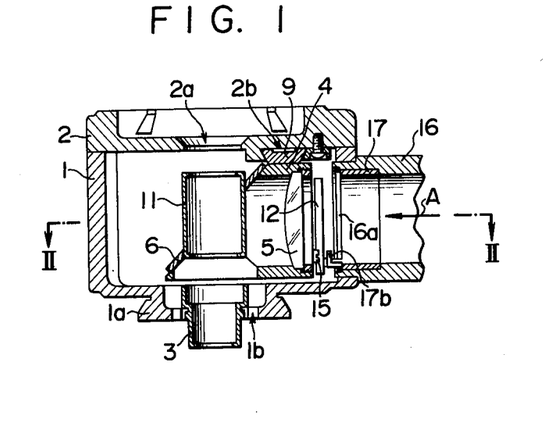
FIG. 1 is a longitudinal section of a light path switching assembly of a vertical illuminator for a microscope according to one embodiment of the invention.

FIGS. 1 and 2 are respectively a longitudinal section and a horizontal section of a light path switching assembly of a vertical illuminator for a microscope according to a first embodiment of the invention. The vertical illuminator shown is adapted to be mounted between a base (not shown) of a microscope in which an objective lens is disposed and a lens barrel (also not shown) in which an eyepiece is disposed, for illuminating a specimen from the objective lens side. The vertical illuminator includes a body which is defined by a box-shaped frame 1 having a bottom wall which is centrally provided with attachment frame 1a for mounting the illuminator on the base of the microscope. The frame 1 has an open top, to which an attachment frame 2 in the form of a lid is integrally secured for allowing the lens barrel to be fixedly mounted on the illuminator. The attachment frame 1a is centrally formed with an opening 1b for allowing the passage of illuminating light and observation light therethrough, and a light shielding sleeve 3 is loosely fitted centrally in the opening 1b and integrally secured to the frame 1 to prevent direct impingement of a dark field illumination light onto the objective lens. An opening 2a is centrally formed in the upper attachment frame 2 in vertical alignment with the opening 1b to permit the passage of observation light therethrough.

A light path switching assembly 4 is slidably disposed within the frame 1. The assembly 4 is defined by a rectangular block (see FIG. 3) in which a pair of juxtaposed openings 4a, 4b are formed to define the light paths for the bright and the dark field illumination, respectively. The front side of the block is bevelled to define an angle of 45°. Secured to the front end face of the block are a half mirror 8, used to provide a bright field illumination, in alignment with the opening 4a, and also an annular reflecting mirror 6, used to provide a dark field illumination, in alignment with the opening 4b. The annular reflecting mirror 6 has a central opening in which a light shield sleeve 11 is fitted and secured thereto in order to prevent direct impingement of dark field illumination light into the objective lens. Bright field illumination lenses 7 and a dark field illumination lens 5 are fitted into the rear end of the openings 4a, 4b, respectively, and are fixed therein. A pivot 13 is fixedly mounted on the rear surface of the block 4 at the lower, right-hand corner, as viewed in FIG. 3, and a filter carrier 12 has its one end pivotally mounted thereon.

The filter carrier 12 is formed to have a circular extension in which a circular opening is formed to receive an $N\theta$ filter 14 therein as a light diminishing member. Toward the one end and out of the region of the circular opening, the filter carrier 12 fixedly carries a pin 12a which is adapted to be engaged by a pawl 17b of an expel ring 17, to be described later. The filter carrier 12 normally assumes a position in which its one lateral side abuts against a stop pin 15 fixedly mounted on the rear surface of the block 4 so that the $N\theta$ filter 14 is located opposite to the other end of the opening 4a which defines the bright field illumination path (see FIGS. 3 and 4). When a condition for bright field illumination is established, the carrier 12 may be turned clockwise about the pivot 13 to retract the filter 14 out of the illumination path (see FIG. 5).

A dovetail member 9 is secured to the upper end face of the block 4 so that its lengthwise direction is perpendicular to the length of the openings 4a, 4b, and is slidably fitted into a dovetail groove 2b formed in the lower surface of the attachment frame 2. Secured to the right-hand side, or the lower surface as viewed in FIG. 2, of the block 4 is one end of a rod-shaped light path switching member 10, the free end of which extends through an opening formed in the frame 1 to the outside thereof, with a knob 10a fixedly mounted thereon. In FIG. 2, reference characters 20a, 20b represent cut set screws which are fixed in the frame 1 for abutment against the lateral sides of the block 4 to limit its extent of movement in a manner such that in each abutting position of the block, the opening 1b is aligned with either the half mirror 8 or the annular reflecting mirror 6, respectively. Accordingly, when the knob 10a is pushed toward the sidewall of the frame 1, the guiding action provided by the cooperation between the dovetail member 9 and the dovetail groove 2a causes a sliding movement of the block 4 until it abuts against the cut screw 20a (see (FIG. 3), whereupon it comes to a rest and establishes a condition for dark field illumination. Such position of the block 4 will be hereafter referred to as a position for dark field illumination. Subsequently when the knob 10a is pulled away from the frame 1, the block 4 similarly slides unti it bears against the cut screw 20b (see FIG. 4) where it comes to a rest and establishes a condition for bright field illumination. This position of the block 4 will be hereafter referred to as a position for bright field illumination.

An illumination lens frame 16 has its one end fixedly mounted in the central region of the rearwall of the frame 1, or the right-hand sidewall as viewed in FIGS. 1 and 2, and extend through the rear wall. The lens frame 16 is disposed so that its central axis aligns with the axis of either opening 4a or 4b when the block assumes a position for bright or dark field illumination, respectively. Adjacent to the one end of the lens frame 16, an expel ring 17 in the form of a short hollow cylinder is rotatably disposed therein and is locked against withdrawal by a wire ring 16a. The expel ring 17 includes a pawl 17b which projects into the frame 1 for causing a movement of the pin 12a to retract the $N\theta$ filter 14 out of the illumination light path. Adjacent to its rear end, the expel ring 17 fixedly carries an operating pin 17a on its sidewall, which extends through a diametrical slot formed in the lens frame 16 to the outside thereof. A coiled tension spring 18 has its one end anchored to a pin 19 which is fixedly mounted on the frame 1 and its other end engaged with the pawl 17b, whereby the expel ring 17 is urged to rotate clockwise, as viewed from the direction of an arrow A shown in FIG. 1. The resulting rotation of the expel ring 17 causes it to assume a normal position in which the operating pin 17a abuts against one end face of the slot. In this normal position, the pawl 17b assumes its lowermost position where in the condition for bright field illumination, it bears against the pin 12a on the filter carrier 12 which has its one lateral side abutting against the stop pin 15 (see FIG. 4). Accordingly, if the pin 17a is operated against the resilience of the spring 18 under this condition, the expel ring 17 rotates to cause the pawl 17b to expel the pin 12a, thus causing the filter carrier 12 to rotate about the pivot 13 to expel the Nθ filter 14 out of the illumination light path (see FIG. 5).

While not shown, an illumination lens is disposed in the other end of the lens frame 16, which is connected to a lamp housing including an illumination lamp therein.

Figure 3:
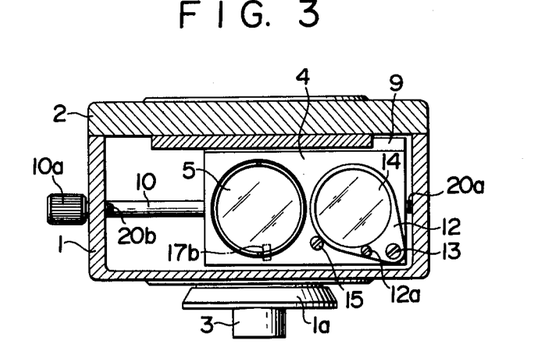
FIGS. 3 to 5 are cross sections taken along the line III—III shown in FIG. 2, illustrating several different phases of operation of the switching assembly shown in FIG. 1.

The operation of the illuminator will be described with reference to FIGS. 3 to 5. FIG. 3 shows a condition for dark field illumination achieved by pushing the knob 10a toward the frame 1. At this time, the block 4 bears against the cut screw 20a and the opening 4b is aligned with the lens frame 16, and the annular reflecting mirror 6 is aligned with the opening 1b (see FIG. 2). Therefore, light emitted by the illumination lamp passes through the illumination lens 5 and falls onto the annular mirror 6 where only marginal light, exclusive of central light, is reflected by the mirror 6 to pass through the marginal region of the opening 1b, outside the light shield sleeve 3, for illuminating the surface of a specimen. In this manner, a dark field illumination is achieved. Light reflected by the surface of the specimen returns as observation light through the objective lens, light shield sleeves 3, 11 and the eyepiece for observation by a viewer. In this condition for dark field illumination, the filter carrier 12 bears against the stop pin 15, whereby the filter 14 is located opposite to the opening 4a which defines a path for bright field illumination.

Figure 4:
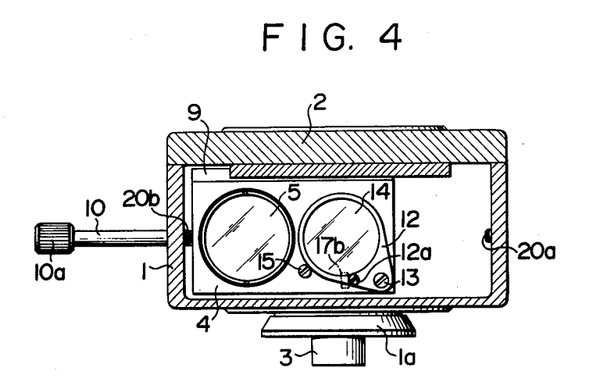
Figure 5:
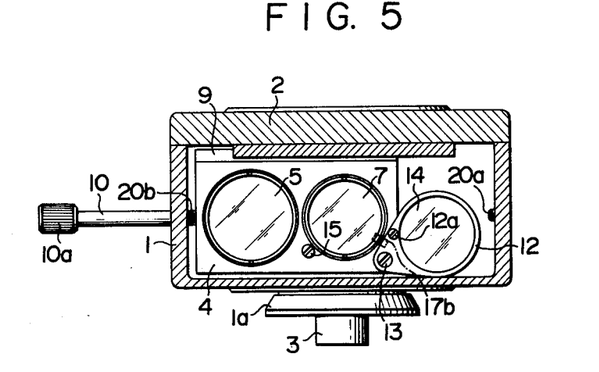

Subsequently, when the knob 10a is pulled away from the frame 1 to bring the block 4 into abutment against the cut screw 20b where a position for bright field illumination is reached, as shown in FIG. 4, the lens frame 16 is now aligned with the opening 4a and the half mirror 8 is aligned with the opening 1b, thus establishing a condition for bright field illumination. During such movement, the filter carrier 12 moves together with the block 4 while maintaining its abutment against the stop pin 15, whereby the filter 14 is inserted into the illuminating light path. Accordingly, light emitted by the illumination lamp passes through the filter 14 and the illumination lenses 7 to reach the half mirror 8, which reflects part of the light for passage through the inside of the light shield sleeve 3, the marginal region of the opening 1b and the objective lens to illuminate the surface of the specimen. In this manner, a bright field illumination is achieved. Light reflected by the surface of the specimen passes through the objective lens, the light shield sleeves 3, 11 and the eyepiece for observation by a viewer. When the illumination is changed from the dark to the bright field illumination as mentioned above, the Nθ filter 14 is automatically inserted into the illumination light path to decrease a difference in the brightness of the field of view between the both illuminations, thus avoiding any likelihood that the eyes of a viewer may be damaged.

When an illumination of an increased level is required under the condition of bright field illumination for purpose of taking a picture, the Nθ filter 14 may be manually expelled out of the illumination light path. To this end, the operating pin 17a may be turned against the resilience of the spring 18. This causes the expel ring 17 to rotate counter-clockwise, whereby the pawl 17b drives the pin 12a to rotate the filter carrier 12 clockwise about the pivot 13 to expel the Nθ filter 14 out of the illumination light path, as shown in FIG. 5. When the operating pin 17a is then released, the expel ring 17 rotates in the opposite direction under the resilience of the spring 18 until its normal position is resumed, but the filter carrier 12 remains in a position in which its lateral side remote from the pin 12a bears against the bottom of the frame 1 by gravity, thus maintaining the filter 14 out of the illumination light path. The purpose of allowing only the expel ring 17 to be returned to its normal position is to avoid the inconvenience that the pin 12a may remain entangled with the pawl 17b when changing the illumination from the bright to the dark field illumination or that the pawl 17b may inadvertently engage the pin 12a to expel the filter carrier 12 out of the illumination light path when changing from the dark to the bright field illumination, which migh occur if the pawl 17b is left in a position engageable with the pin 12a. In the condition for bright field illumination, an illumination of a sufficient brightness is available for purpose of taking a picture, by expelling the filter 14 out of the illumination light path, as required.

To return to the condition for dark field illumination from the condition for bright field illumination in which the filter 14 is expelled out of the illumination light path, it is only necessary that the knob 10a be pushed toward the frame 1. As the knob 10a is pushed, the filter carrier 12 comes into abutment against the inner wall of the frame 1 to be urged thereby to rotate counter-clockwise about the pivot 13, inasmuch as the location of abutment is disposed above the pivot 13. In the condition for dark field illumination which is achieved by fully pushing the knob 10a toward the frame (see FIG. 2), the filter carrier 12 automatically returns to its position where its one lateral side bears against the stop pin 15 and where it is aligned with the opening 4a. When returning from the condition for bright field illumination shown in FIG. 4 where the filter 14 remains on the illumination light path to the condition for dark field illumination shown in FIG. 3, the filter carrier 12 moves together with the block 4 while maintaining its abutment against the stop pin 15, and the Nθ filter 14 also moves out of the illumination light path.

Figure 6:
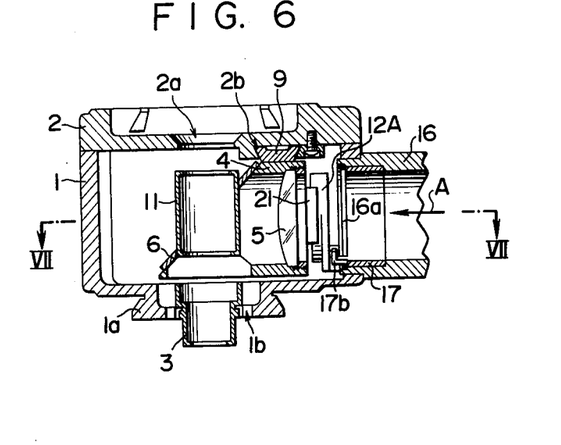
FIG. 6 is a longitudinal section of a light path switching assembly of a vertical illuminator for a microscope according to another embodiment of the invention.
Figure 7:
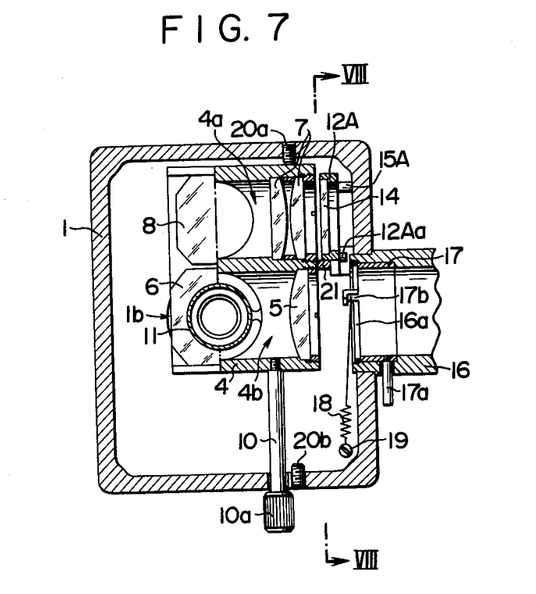
FIG. 7 is a horizontal section of the switching assembly taken along the line VII—VII shown in FIG. 6.

FIGS. 6 and 7 are a longitudinal section and a horizontal section of a light path switching assembly of a vertical illuminator for microscope according to another embodiment of the invention. The vertical illuminator shown achieves the similar functioning and effect as the previous embodiment, by mounting a filter carrier 12A in a rotatable manner on the frame 1, rather than rotatably mounting the filter carrier 12 on the block 4 as in the vertical illuminator of FIGS. 1 to 5. Specifically, the filter carrier 12A of this embodiment is formed of a magnetic material, and has its one end pivotally mounted on a pivot 13a (see FIG. 8) which is fixedly mounted on the rear wall of the frame 1. The location of the pivot 13a is chosen to be on the lower, left-hand side, as viewed in FIG. 8, of the illumination lens frame 16 so that when the filter carrier 12A rotates clockwise about the pivot 13a, an Nθ filter which is fitted in the opening formed in the filter carrier 12A is aligned with the center axis of the illumination lens frame 16 (see FIG. 9). A stop pin 15A is fixedly mounted on the rear wall of the frame 1 at its left-hand, lower corner for abutment against one lateral sides of the filter carrier 12A to limit the angular movement thereof when the filter carrier 12A is expelled out of the illumination light path. A pin 12Aa is fixedly mounted on the rear side of the filter carrier 12A centrally lengthwise and toward the other side which is remote from the side adjacent which the pin 15A is located, for engagement with a pawl 17b of an expel ring 17. An elongate permanent magnet 21 is fixedly mounted centrally on the rear surface of the block 4 and projects rearwardly. The magnet 21 bears against the other side of the filter carrier 12A, which comprises a magnetic material, to hold it by attraction whenever the block 4 has moved to its position for dark field illumination (see FIG. 8).

Other members which have not been specifically referred to are constructed in the similar manner as corresponding members shown in FIGS. 1 to 5, and are designated by like reference characters without repeating their detailed description. The same applies to subsequent embodiments.

Figure 8:
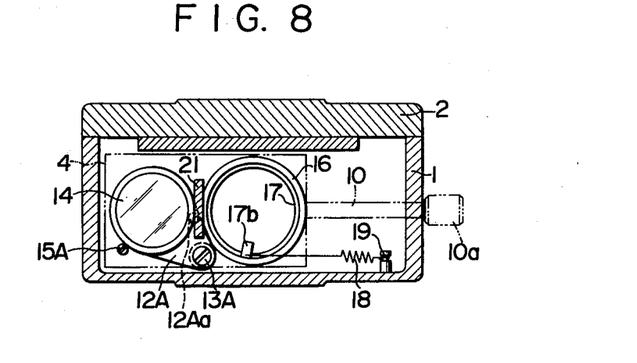
FIGS. 8 to 10 are cross sections taken along the line VIII—VIII shown in FIG. 7, illustrating several phases of operation of the switching assembly shown in FIG. 6.

In operation, FIG. 8 shows the block 4 in a position for dark field illumination, which is achieved by pushing the knob 10a toward the frame 1. Under this condition, the opening 4b is located opposite to the illumination lens frame 16, the annular reflecting mirror 6 is aligned with the opening 1b (see FIG. 7), and the filter carrier 12A is driven by the permanent magnet 21 to move out of the illumination light path. Accordingly, light emitted by the illumination lamp passes through the illumination lens 5 and is reflected by the annular mirror 6 to provide a dark field illumination of the surface of a specimen.

Figure 9:
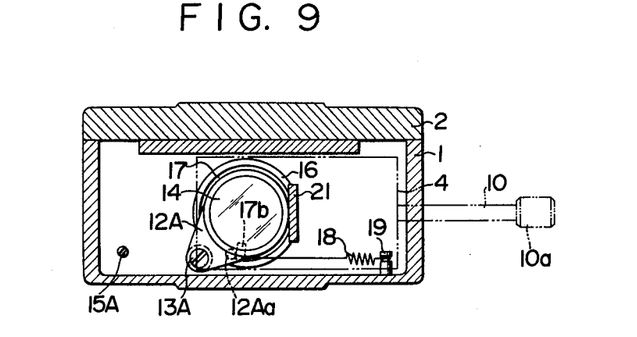

Subsequently, when the knob 10a is pulled away from the frame 1 to move the block 4 to its position for bright field illumination as shown in FIG. 9, the opening 4a is located opposite to the lens frame 16, the half mirror 8 is aligned with the opening 1b and the filter carrier 12A moves clockwise about the pivot 13A while being held attracted to the magnet 21, thus bringing the $N\theta$ filter 14 into the illumination light path. Accordingly, the light emitted by the illumination lamp is diminished in intensity by the filter 14 to reach the half mirror 8, which reflects it to provide a bright field illumination of the surface of a specimen.

Figure 10:
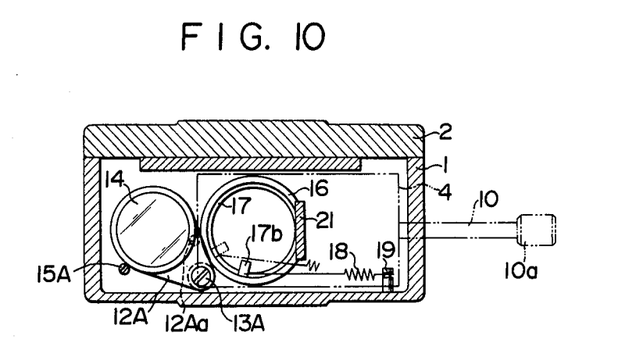

To expel the filter 14 out of the illumination light path under the bright field illumination condition, the operating pin 17a may be operated to cause a clockwise rotation of the expel ring 17 as indicated in phantom line in FIG. 10. This causes the pawl 17b to drive the pin 12Aa to rotate the filter carrier 12A counter-clockwise about the pivot 13A against the attraction exerted by the magnet 21 until its lateral side bears against the stop pin 15A where it rests stationary and located out of the light path. Accordingly, the light emitted by the illumination lamp reaches the half mirror 8 without being attenuated by the filter 14 to provide a bright field illumination of the surface of a specimen at a higher level. When the pin 17a is released, the ring 17 automatically returns to its normal position under the resilience of a spring 18.

To return from the bright field illumination condition in which the filter 14 is expelled out of the light path to the dark field illumination condition illustrated in FIG. 8, the knob 10a may be pushed toward the frame 1. This causes the block 4 to move until the opening 4b is aligned with the lens frame 16, the annular mirror 6 is aligned with the opening 1b and the magnet 21 bears against the lateral side of the filter carrier 12A, thus achieving a condition for dark field illumination.

In each embodiment described above, the light diminishing member comprises an $N\theta$ filter, but any other member such as diffuser plate may be used instead.

Instead of an expel ring which acts as a mechanism for expelling a filter carrier out of the illumination light path, such mechanism may comprise other means, for example, a plunger solenoid which is provided with a return spring.

Instead of disposing the filter carrier in a rotatable manner so as to be moved into or out of the illumination light path, it may be slidably disposed on a guide rail which is mounted on the body frame to provide a similar functioning.

In the embodiment shown in FIGS. 6 to 10, the entire filter carrier is formed of a magnetic material, but only that portion of the carrier which is adapted to engage the permanent magnet may be formed of a magnetic material.

Figure 11:
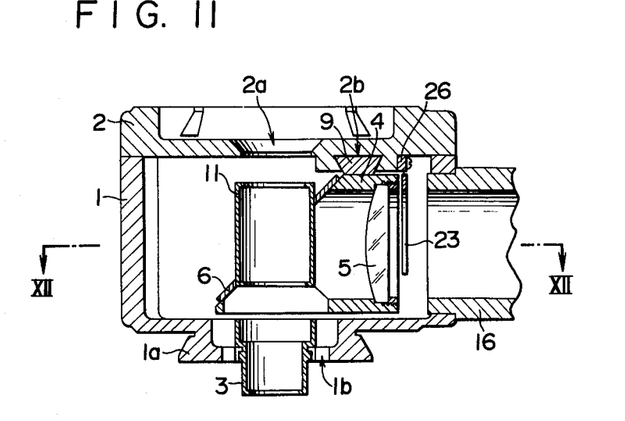
FIG. 11 is a longitudinal section of a light path switching assembly of a vertical illuminator for a microscope according to a further embodiment of the invention.
Figure 12:
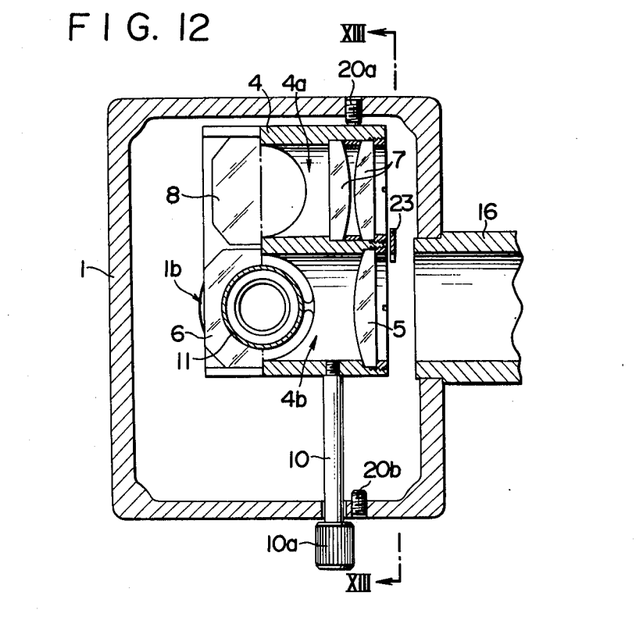
FIG. 12 is a horizontal section of the switching assembly shown in FIG. 11, as taken along the line XII—XII shown therein.
Figure 13:
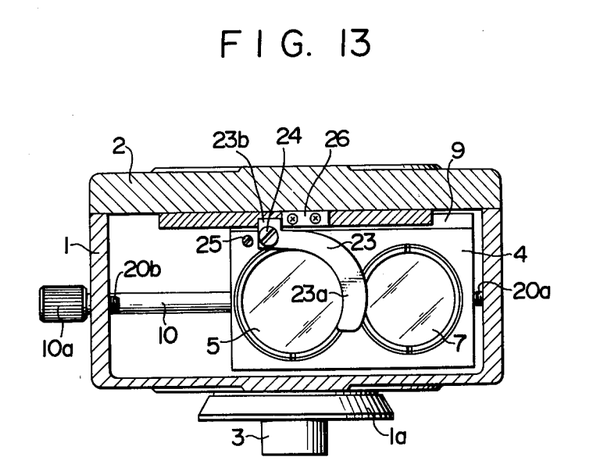
FIGS. 13 and 14 are cross sections taken along the line XIII—XIII shown in FIG. 12, illustrating several phases of operation of the switching assembly shown in FIG. 11.

FIGS. 11 and 12 are a longitudinal section and a horizontal section of a light path switching assembly of a vertical illuminator for microscope according to a further embodiment of the invention. In this vertical illuminator, there is provided a light shield member which is designed to avoid an inconvenience that the illuminating light which is totally reflected by the annular mirror 6 temporarily passes through the objective lens to impinge upon the surface of a specimen directly, whereby part of the field of view glares to a very high level to thereby cause a damage of the eyes of a viewer. The shield member operates to intercept such harmful light. As shown in FIG. 13, in this vertical illuminator, a sickle-shaped light shield member 23 has its one end pivotally mounted on a pivot 24 which is fixedly mounted on the rear side of the block 4 so that it advances partly into the illumination light path to intercept harmful light. The light shield member 23 includes a sickle-shaped shield 23a which extends downwardly and to the right, as viewed in FIG. 13, and a short projection 23b which extends vertically upward. Since the pivot 24 is fixedly mounted on the rear side of the block 4 at a point adjacent to the top of the opening 4b and slightly offset to the left thereof, the shield member is capable of effectively intercepting the right-hand peripheral region of the illumination light path. An expel member 26 is fixedly mounted on the attachment frame 2 for engagement with the vertical projection 23b to control the angular limit to which the light shield member 23 can be turned clockwise. A stop pin 25 is fixedly mounted on the rear side of the block 4 toward the left-hand, upper corner thereof for abutment against the lateral side of the projection 23b to limit the angle to which the light shield member 23 can be turned counter-clockwise.

In operation, it is to be noted that FIG. 13 shows the light path switching block 4 assuming its position for dark field illumination, which is attained by pushing the knob 10a toward the frame 1. Under this condition, the projection 223b bears against the expel member 26, whereby the light shield member 23 assumes its angular position about the pivot 24 which is most advanced counter-clockwise, and the shield 23a is retracted out of the illumination light path. Accordingly, the light emitted by the illumination lamp provides a dark field illumination of the surface of a specimen, without being in any way intercepted by the light shield member 23.

Figure 14:
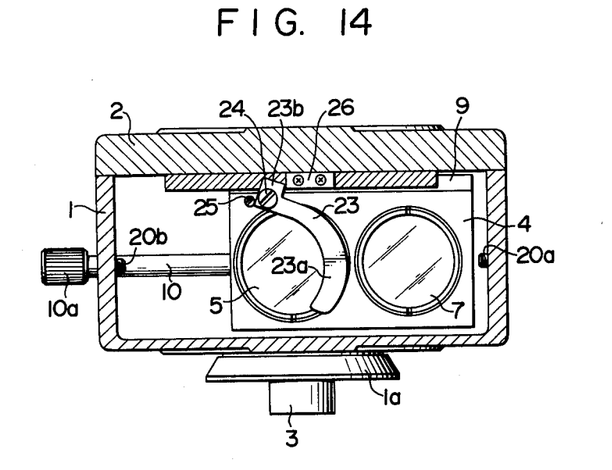

When the knob 10a is pulled away from the frame 1 through a reduced stroke as shown in FIG. 14 in order to establish a bright field illumination, the block 4 moves to cause the center of the annular mirror 6 to be displaced from the principal optical axis of the objective lens, whereby the illuminating light which is totally reflected by the right-hand edge, as viewed in FIG. 13, of the reflecting mirror 6 would be partly effective to provide a direct illumination of the surface of a specimen through the objective lens. However, as the block 4 moves, the projection 23b is no longer constrained by the expel member 26, whereby the light shield member 23 slightly turns clockwise about the pivot 24 by gravity, and comes to a stop by abutment against the stop pin 25 where the sickle-shaped shield 23a is advanced into the illumination light path. Accordingly, the illuminating light which would otherwise impinge upon the right-hand edge of the annular mirror 6 is intercepted, preventing the likelihood that the totally reflected light from the mirror 6 directly illuminates the surface of the specimen. In this manner, the likelihood is avoided that part of the field of view assumes a very high brightness to cause a damage to the eyes of a viewer.

As the knob 10a is pulled away from the frame 1 through an increased stroke to establish a bright field illumination, the light shield member 23 is located opposite to the opening 4b. Subsequently, when the knob 10a is pushed again toward the frame 1, the projection 13b abuts against the expel member 26 immediately before a condition for dark field illumination is established, thus causing the light shield member 23 to rotate counterclockwise about the pivot 24 to be moved out of the illumination light path. Thus, the likelihood of the totally reflected light from the annular mirror 6 directly illuminating the surface of specimen to cause a damage to the eyes of a viewer is again avoided, as when changing from the dark to the bright field illumination.

Figure 15:
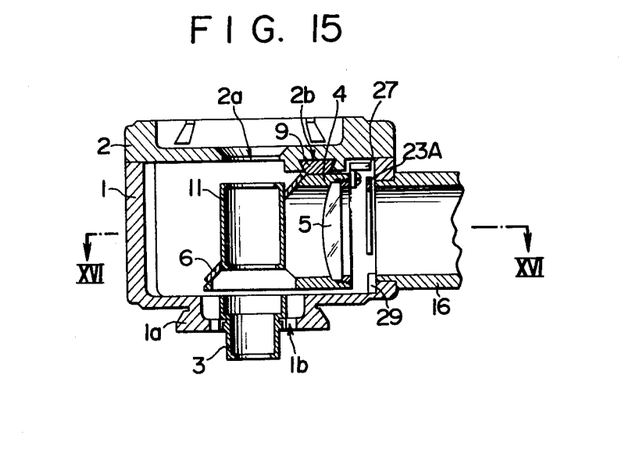
FIG. 15 is a longitudinal section of a light path switching assembly of a vertical illuminator for microscope according to an additional embodiment of the invention.
Figure 16:
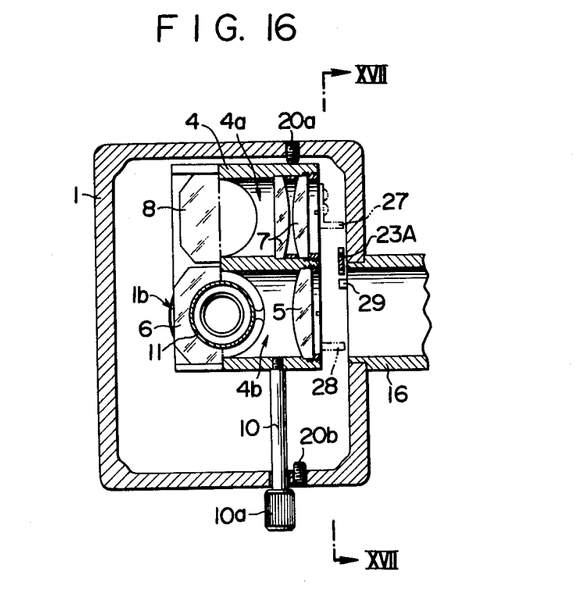
FIG. 16 is a horizontal section of the light path switching assembly of FIG. 15 as taken along the line XVI—XVI shown in FIG. 15.

FIGS. 15 and 16 are a longitudinal section and a horizontal section of a light path switching assembly of a vertical illuminator for microscope according to an additional embodiment of the invention. This vertical illuminator achieves the similar functioning and effect as that achieved by the vertical illuminator shown in FIGS. 11 to 14, by rockably mounting a light shield member 25A on the frame 1, rather than providing the light shield member 23 on the block 4 in a rockable manner as in FIGS. 11 to 14. Specifically, in this vertical illuminator, the light shield member 23A is rockably mounted on a pivot 24A which is fixedly mounted on the inside of the rear wall of the frame 1 (see FIG. 17). The member 23A includes a shield 23Aa and a projection 23Ab, and also includes a second projection 23Ac which extends a short distance in the opposite direction from the projection 23Ab. (The projection 23Ab will be hereafter referred to as a first projection to make a distinction from the second projection 23Ac.) The location of the pivot 24A is chosen to be adjacent to the top of the illumination lens frame 16 and slightly displaced to the right therefrom, as viewed in FIG. 17, so that as the light shield member 23A rocks about the pivot 24A, it can be moved into or out of the illumination light path which is defined by the lens frame 16. As the light shield member 23A moves angularly to overlap the left-hand edge of the illumination light path, as viewed in FIG. 17, the free end of the shield 23Aa engages a tab 29 formed on the bottom of the frame 1 to prevent a further angular movement of the light shield member into the illumination light path. An expel member 27 and an expel pin 28 are fixedly mounted on the rear side of the block 4 for retracting the light shield member 23A out of the illumination light path. The expel member 27 is fixedly mounted on the rear side of the block 4 adjacent to the upper, left-hand corner, as viewed in FIG. 17, so as to abut against the first projection 23Ab from the left. The expel pin 28 is fixedly mounted on the rear side of the block 4 adjacent to the upper, right-hand corner, as viewed in FIG. 17, so as to be capable of abutting against the second projection 23Ac from the right.

Figure 17:
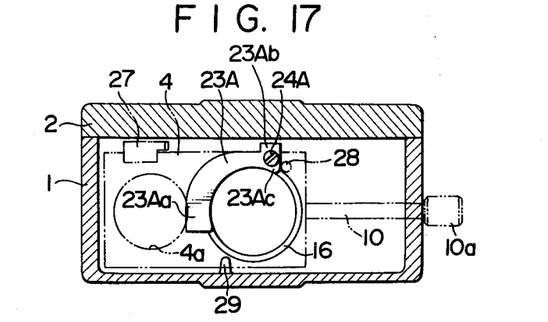
FIGS. 17 to 19 are cross sections taken along the line XVII—XVII shown in FIG. 16, illustrating several phases of operation of the switching assembly shown in FIG. 15.
Figure 18:
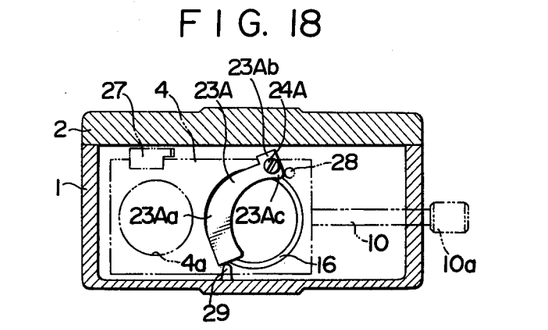

The operation of the vertical illuminator will now be described. FIG. 17 shows a position of the block 4 for dark field illumination, which is attained by pushing the knob 10a toward the frame 1. Under this condition, the expel pin 28 abuts against the second projection 23Ac from the right thereof, whereby the light shield member 23A rotates clockwise about the pivot 24A to be expelled out of the illumination light path. Accordingly, the light emitted by the illumination lamp provides a dark field illumination of the surface of the specimen without being intercepted in any way by the light shield member 23A.

Figure 19:
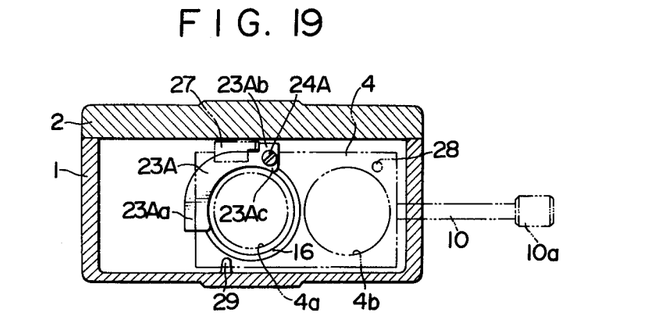

When the knob 10a is pulled out slightly from this condition in order to change to a bright field illumination, the movement of the block 4 causes the expel pin 28 to be disengaged from the second projection 23Ac, whereby the light shield member 23A rotates about the pivot 24A by gravity, allowing the shield 23Aa to engage the tab 29 where it comes to a stop, partly advanced into the illumination light path. Thus, the light shield member 23A intercepts the illuminating light which is totally reflected by the annular mirror 6 and which tends to be incident on the objective lens. This avoids the likelihood that part of the field of view assumes a very high brightness level to cause a damage to the eyes of a viewer. As the knob 10a is further pulled away, the expel member 27 abuts against the first projection 23Ab from the left immediately before a position for bright field illumination is reached, causing the light shield member 23A to rotate clockwise about the pivot 24A to expel the member 23A out of the illumination light path, as indicated in FIG. 19. Accordingly, the illuminating light provides a bright field illumination of the surface of a specimen without being intercepted by the light shield member 23A. When the knob 10a is fully pulled out, the condition for bright field illumination is established.

Subsequently, when the knob 10a is then pushed toward the frame in order to re-establish the condition for dark field illumination, the expel member 27 moves away from the first projection 23Ab after a slight stroke of the knob, whereby the light shield member 23A turns counter-clockwise about the pivot 24A by gravity, advancing into the illumination light path and engaging the tab 29 whereupon it comes to a stop.

Immediately before the condition for dark field illumination is established, the expel pin 28 abuts against the second projection 23Ac from the right, causing the light shield member 23A to rotate clockwise about the pivot 24, thus expelling it out of the illumination light path to establish a condition for dark field illumination. Again, the light which is totally reflected by the annular mirror 6 and impinging upon the objective lens is effectively intercepted by the light shield member 23A. After the condition for dark field illumination is established, the illuminating light provides a dark field illumination of the surface of a specimen without being in any way intercepted by the light shield member 23A.

What is claimed is:

1. A vertical illuminator for a microscope which permits a change between a dark field and a bright field illumination through a switching of a reflecting mirror and an illumination lens, comprising:
   a light path switch block including bright field illumination optics and dark field illumination optics, said block being disposed with a frame and movable between a dark field illumination position wherein said dark field illumination optics aligns with the optical path of a source of light and a bright field position wherein said bright field illumination optics aligns with said optical path of a source of light;
   a light diminishing member disposed so as to be automatically inserted into said optical path when said block is moved into said bright field illumination position; and
   a human actuable expel mechanism capable of retracting said light diminishing member from said optical path when said block has moved to said bright field illumination position.

2. A vertical illuminator according to claim 1 in which the block is slidably disposed within the frame, the frame including a guide for engaging a portion of the block.

3. A vertical illuminator according to claim 1 in which said bright field illumination optics includes a combination of a half mirror and a bright field illumination lens and wherein said dark field illumination optics includes an annular reflecting mirror and a dark field illumination lens.

4. A vertical illuminator according to claim 1 in which the light diminishing member comprises an $N\theta$ filter.

5. A vertical illuminator according to claim 1 in which the light diminishing member is mounted on a carrier which is in turn mounted on the light path switching block in a movable manner so that as the block moves to said dark field illumination position, the light diminishing member is moved into an optical path of said bright field illumination optics and so that as the block moves to said bright field illumination position, the diminishing member moves together with the block into said optical path of said source of light.

6. A vertical illuminator according to claim 1 in which the light diminishing member is mounted on a carrier formed of a magnetic material which is in turn mounted on the frame in a movable manner so that as the block moves to said dark field illumination position, the carrier is driven out of said optical path under the influence of a permanent magnet which is mounted on the block and as the block moves to said bright field illumination position, the carrier is pulled by the permanent magnet into said optical path.

7. A vertical illuminator according to claim 1 in which the expel mechanism comprises an expel ring which is rotatably mounted on an illumination lens frame, a pawl mounted on the expel ring, and a pin mounted on a carrier which carries the light diminishing member and capable of engaging the pawl.

8. A vertical illuminator according to claim 7, further including resilient means which urges the pawl in a direction away from the pin.

9. A vertical illuminator for a microscope which illuminator permits the operator to select a bright field illumination and a dark field illumination, said illuminator comprising:
   a light path switching block movably disposed within a frame, said light path switching block including a first combination defined by a half mirror and a bright field illumination lens and a second combination defined by an annular reflecting mirror and a dark field illumination lens, said switching block being movable between a first position wherein the combination of a half mirror and the bright field illumination lens is located within an illumination light path of said vertical illuminator to provide a bright field illumination and a second position wherein the annular reflecting mirror and the dark field illumination lens is inserted into the illumination light path to provide a dark path illumination;
   a movable light shield member capable of shielding part of an illumination light; and
   an expel mechanism for retracting the light shield member out of the illumination light path in response to movement of the light path switching block.

10. A vertical illuminator for a microscope which permits a bright field illumination and a dark field illumination to be selectively utilized by a switching of a reflecting mirror and an illumination lens, said illuminator comprising:
    a light path switching block movably disposed within a frame;
    a movable light shield member capable of shielding part of an illumination light path, said light shield member comprising a sickle-shaped plate member; and
    an expel mechanism for retracting the light path shield member out of the illumination light path in response to a movement of the light path switching block.

11. A vertical illuminator for a microscope which permits a bright field illumination and a dark field illumination to be selectively utilized, said illuminator comprising:
    a light path switching block movably disposed within a frame, the light path switching block being movable between a bright field illumination position and a dark field illumination position;
    a movable light shield member capable of shielding part of an illumination light path, the light shield member being mounted on the block so as to be angularly movable, the light shield member moving together with the block out of the illumination light path as the block moves from its dark field to its bright field illumination position; and
    an expel mechanism for expelling the light shield member out of the illumination light path as the block is moved from its bright field to its dark field illumination position.

12. A vertical illuminator for a microscope with permits a bright field illumination and a dark field illumination to be selectively utilized, the illuminator comprising:
    a light path switching block movably disposed within a frame, the light path switching block being movable between a bright field illumination position and a dark field illumination position;
    a movable light shield member capable of shielding part of an illumination light path, the light shield member being mounted on the frame so as to be angularly movable and being normally rotated into the illumination light path by the force of gravity; and means for moving the light shield member out of the illumination light path whenever the light path switching block is in its bright field illumination position or its dark field illumination position whereby the light shield member is only in the illumination light path when the light path switching block is being moved between its bright field and dark field illumination positions.

13. A vertical illuminator in accordance with claim 12, wherein said means for moving the light shield member out of the illuminator block comprises an expel member and an expel pin each of which are coupled to said light path switching block, the expel pin being coupled to the light path switching block at such a location that it contacts the movable light shield member and rotates the movable light shield member out of the illumination ligh path when the light path switching block is moved into the dark field illumination position and wherein the expel member is connected to the light path switching block at such a location that it contacts the movable light shield member and rotates the movable light shield member out of the illumination light path whenever the light path switching block is moved into the bright field illumination position.

14. A vertical illuminator for a microscope which permits a bright field illumination and a dark field illumination to be selectively utilized, the illuminator comprising:
a light path switching block movably disposed within a frame, the light path switching block being moved between a bright field illumination position and a dark filed illumination position;
a movable light field member capable of shielding part of an illumination light path; and
an expel mechanism for retracting the light shield member out of the illumination light path in response to movement of the light path switching block, the expel mechanism being formed by an expel member which is fixedly mounted on the frame and which is disposed for abutment against the light shield member which is mounted on the block in an angularly movable manner to move the shield member out of the illumination light path as the block moves to its dark field illumination position.

15. A vertical illuminator for a microscope which permits a bright field illumination and a dark field illumination to be selectively utilized, the illuminator comprising:
a light path switching block movably disposed within a frame, the light path switching block being moved between a bright field illumination position and a dark filed illumination position;
a movable light field member capable of shielding part of an illumination light path; and
an expel mechanism for retracting the light shield member out of the illumination light path in response to movement of the light path switching block, the expel mechanism comprising a first and a second expel member, both expel members being fixedly mounted on the light path switching block and disposed for abutment against the light shield member which is mounted on the frame in an angularly movable manner to move the shield member out of the illumination light path as the block moves to either its bright field illumination position or its dark field illumination position.

* * * * *